Sept. 13, 1960     R. H. SPERZEL ET AL     2,952,830
CABLE CONNECTOR
Filed April 30, 1957
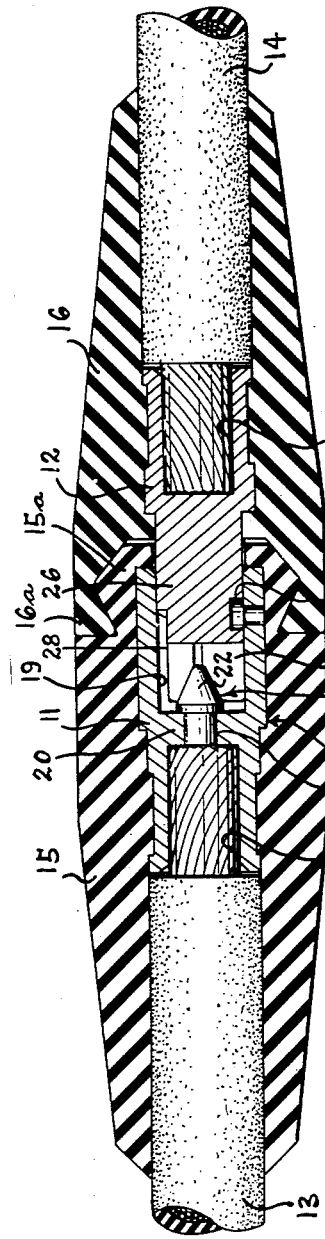
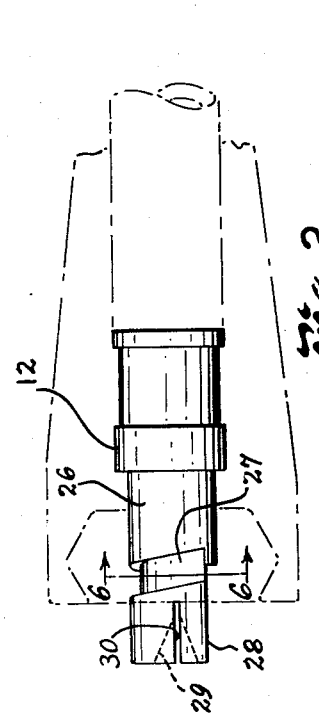
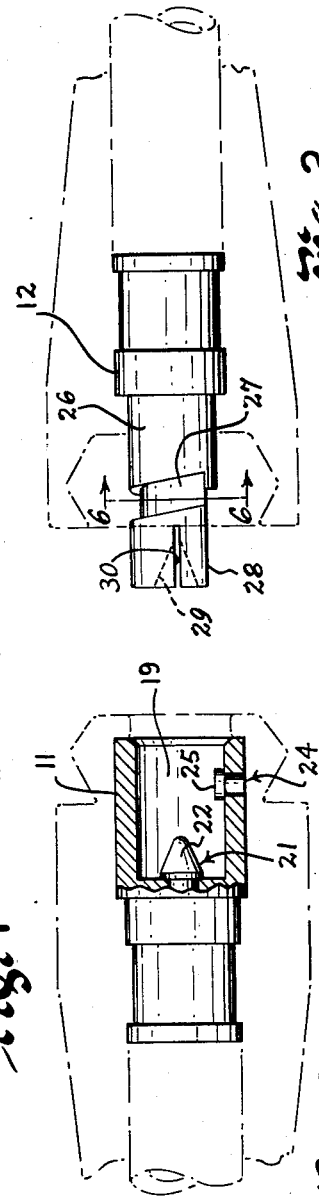
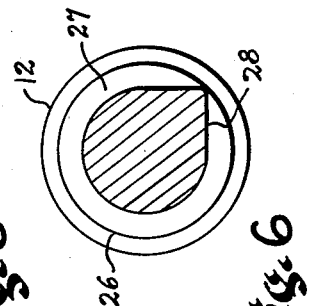
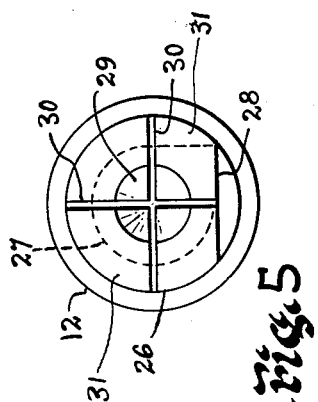
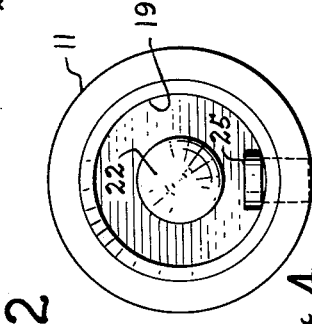
INVENTORS
ROBERT H. SPERZEL & GEORGE AUSTIN FINGER
BY
Steward + Steward
ATTORNEYS.

United States Patent Office 2,952,830
Patented Sept. 13, 1960

2,952,830
CABLE CONNECTOR

Robert H. Sperzel, Cheshire, and George Austin Finger, New Milford, Conn., assignors to The Whitney Blake Company, Hamden, Conn., a corporation of Connecticut, and The Thomas & Betts Company, Elizabeth, N.J., a corporation of New Jersey Filed Apr. 30, 1957, Ser. No. 655,998

1 Claim. (Cl. 339—88)

This invention relates to cable connectors and has particular reference to separable connecting means for coupling sections of electrical cables.

Heavy electric cables such as the type used in conjunction with emergency power units or electric welding equipment are generally supplied in relatively short sections with connectors at opposite ends of each section so that any two or more sections may be coupled together to produce a desired length of cable. While this feature provides a convenient means for varying the total lengths of heavy cables, considerable difficulty has been encountered in providing a secure coupling for the cable sections which may be readily assembled or disassembled while at the same time offering little or no electrical resistance in the line when in use. In extended lengths of coupled power cables, such electrical resistance causes a detrimental heating of the couplings and adjacent parts of the line and substantial loss in power at the cable terminals. In order to overcome this, it is essential that the separable connection between the complementary coupling members be extremely tight and secure and provide a substantial area of electrical contact between such members. In addition, such contact must be intimate metal-to-metal engagement.

Accordingly, it is a principal object of the present invention to provide an improved separable connecting means for use with electrical conductors which is mechanically secure and provides superior electrical contact between the separable parts of the connector.

Another object is to provide coupling means for electrical cables having a pair of separable connecting members adapted to be assembled in interfitting, positively locked relation with each other to provide a mechanically secure connection between adjacent sections of cable.

Another object is to provide a separable interlocking connector for splicing high current electric cables which, when in use, is adapted to provide an extremely secure mechanical linkage between the cables connected thereby while simultaneously producing an improved internal surface contact between the separable parts by causing one of the parts of said connecting means to be forcibly expanded into intimate engaging relation with the other part thereof.

A still further object is to provide simple, economical and highly efficient separable cable connectors wherein the construction of the parts thereof may be readily standardized to render them interchangeable in use.

A connector embodying the invention comprises a socket member and a plug member adapted to be received within the socket member, each of said members having provision for securing a terminal portion of an electrical conductor thereto. A cam slot or groove and cam lug are provided on the connector members so that when the end of the plug is inserted into the socket member and then rotated in the proper direction, the lug engages in the cam slot which causes the end of the plug to be moved into rigid engagement with the base of the socket. In order to ensure good electrical contact between the members and at the same time mechanically lock them together so that they can not be disconnected without positively rotating the members relative to each other in a direction opposite to that when the connection is made, the bottom wall or base of the socket is provided with a projection, hereinafter sometimes referred to as a plug-expanding surface, which engages a correspondingly shaped recess in the end of the plug when said plug is cammed against the bottom of the socket. The end of the plug is resilient so that as the plug is brought up against the projection in the bottom of the socket member, its end is spread laterally into intimate peripheral contact with the inner wall of the socket.

The projection at the base of the socket and the recess in the end of the plug are most desirably conically shaped, with the conical projection either having a slightly greater apex angle than that of the recess or being truncated, so that the end of the plug may be spread laterally by the projection. Moreover, longitudinally extending segments may be provided in the end of the plug by cutting radial slots therein in order to make the metal plug resilient.

A particular advantage of the present invention is that adequate electrical contact between the connector members is ensured. Thus, in addition to the rigid engagement between the conical end surfaces of the members, the periphery of the plug is forced out into solid metal-to-metal engagement with the walls of the socket, resulting in good electrical contact throughout this area as well. Furthermore, frictional engagement between the connector elements is thus greatly increased so that the coupling can not be accidentally jarred loose.

Other objects and advantages of the invention will become apparent from the following specific description of one particular embodiment of the invention shown in the accompanying drawings, in which Fig. 1 is a longitudinal sectional view of the complementary members of the device of the invention shown in an assembled position of use and attached to the ends of electrical conductors which are to be connected thereby;

Fig. 2 is a side elevational view of the socket member of the device of the invention shown partially in section and with the insulating jacket and cable shown in phantom lines for purposes of clarity;

Fig. 3 is a side elevational view, similar to Fig. 2, of the plug member of the device in position to be inserted into the socket member;

Fig. 4 is an enlarged end view of the socket member of Fig. 2 but omitting the insulation entirely; and Figs. 5 and 6 are an end view and cross-section on line 6—6 in Fig. 3, respectively, of the plug member, both views being on the same scale as Fig. 4 and omitting the insulation.

Referring more particularly to the drawings wherein like characters of reference designate like parts throughout the various views thereof, the device of the invention comprises a separable connector 10 embodying a socket part 11 and an insertable plug part 12 which is adapted to be fitted in interlocking relation with socket 11 in the manner illustrated in Fig. 1. Parts 11 and 12 are preferably formed of a suitable copper alloy which is such as to provide a highly conductive electrical path between a pair of electric cables 13 and 14 to be joined thereby, while at the same time being sufficiently durable and strong to provide a rigid coupling capable of withstanding the abuse common to electrical connectors of this nature. A sheath of resilient insulating material such as rubber, plastic or the like is provided about each of the parts 11 and 12 of connector 10 in order to electrically insulate the connector and to render the connection water-proof. Insulating sheath 15, which is fitted about socket 11, extends along cable 13 a substantial distance beyond socket 11 and is provided with a V-shaped annular end part 15a fitted in overlapping relation with the terminal end of said socket member. Part 15a of sheath 15 performs the dual function of protecting socket 11 while providing an attachment means for receiving a complementary channeled end part 16a of a sheath 16 covering plug 12 and cable 14 in a manner analogous to that of sheath 15. It can thus be seen that with socket 11 and plug 12 in assembled relation with each other, as shown in Fig. 1, parts 15a and 16a of the respective sheaths 15 and 16 will be in interfitting locked relation with each other so as to effectively provide a continuous protective covering over the entire assembly. However, when parts 11 and 12 of connector 10 are pulled apart and disconnected, the resiliency of the sheath material will permit ends 15a and 16a thereof to separate readily. In order to avoid longitudinal slipping of sheaths 15 and 16 along their respective cables 13 and 14, said sheaths are molded onto the parts of connector 10 so as to cause the material thereof to fill in and around the various recessed and shouldered configurations of the outer surfaces of parts 11 and 12 in the manner clearly shown in Fig. 1.

Returning now to the coupling means 10 itself, it can be seen that the cables 13 and 14 are secured to the socket and plug parts 11 and 12 in the conventional manner. That is, the insulation is stripped from the ends of the cables, which ends are in turn soldered or brazed in the bores 17 and 18 provided for this purpose in the outer ends of parts 11 and 12, respectively.

Socket 11 is provided with an internal bore 19 of a predetermined depth and terminating at an inner wall 20 which separates said bore 19 from the cable connecting bore 17. An insert 21 having a conical head portion 22 is press fitted or otherwise secured in an aperture 23 of wall 20 and is axially aligned with bore 19 forming a projection at the base of the bore or socket in the socket member 11. The head portion 22 of insert 21 forms means for expanding the end of plug 12, as will be described in greater detail hereinafter. In addition to insert 21, a camming lug 24 is press fitted or otherwise secured in the side wall of bore 19 so as to have its head part 25 protruding inwardly of bore 19 and at a predetermined distance from the annular outer edge of socket 11.

Plug 12 has a generally cylindrical portion 26 of a diameter only slightly less than that of bore 19 in the socket part 11, so as to provide a sliding fit between plug 12 and bore 19 when said plug is inserted in mating relation with socket 11. A helical cam groove 27 is provided in the periphery of portion 26 for engagement with camming lug 24 when the coupling 10 is assembled, whereby plug 12 is moved longitudinally within socket 11 upon rotation of the socket and plug relative to each other. As will be seen in Figs. 5 and 6, the depth of groove 27 is uniform throughout a major portion of its extent. Moreover, the head 25 of lug 24 slides freely yet closely within groove 27. In order to provide means for permitting lug 24 to engage in groove 27, a flat 28 is provided in the periphery of portion 26 adjacent the end thereof to allow the leading end of the plug 12 to pass over lug 24 a distance sufficient to cause lug 24 to come into registry with the leading end of groove 27. Thus, with the socket part 11 and plug part 12 positioned relative to each other in the manner illustrated in Figs. 2 and 3 together, a partial assembly of said parts can be effected by simply sliding the end of plug 12 into bore 19 a distance sufficient to cause head 25 of lug 24 to strike the inner end of flat 28, where it is in registry with the leading end of groove 27. Since the cam groove 27 is provided in this particular instance with a right-hand lead, rotation of plug 12 relative to socket 11 in a clockwise direction, as viewed from the right in Fig. 3, will cause lug 24 to follow groove 27 and consequently advance plug 12 into bore 19 of socket 11.

A pair of crossed slots 30 are cut in the end of the portion 26 of plug 12 dividing the end of the plug into four segments 31 which may be flexed resiliently outward. In addition, a central recess 29 is provided in the end of plug 12 in axial alignment with projection 22 for engagement therewith. In order to make the segments 31 sufficiently flexible, slots 30 extend longitudinally of plug 12 substantially beyond the apex of recess 29, as shown in Figs. 1 and 3. The apex angle of the conical recess 29 is most desirably somewhat less than that of the conical projection 22 so that when these parts are drawn together, the projection will spread the end of the plug laterally. For example, the apex angle of the conical recess may be 48°, while that of the cone is 50°. Another reason for the difference in these angles is that when the segments 31 spread apart, the angle at the apex of the conical recess 29 is increased so that it equals that of the projection 22, causing the outer surface of the projection 22 and the inner surface of the recess 29 to come into full surface engagement with each other, rather than to make a line contact as would be the case where such angles differ when the members are in fully locked position.

It is of course possible to make the conical surfaces of the projection 22 and recess 29 correspond almost exactly when they are made. However, in that event, it would also be necessary to cut off the top of projection 22, so that it could be drawn further into recess 29 in order to spread segments 31. This of course would reduce the area of the conical projection 22 and would, moreover, probably cause a line contact between projection 22 and recess 29 as the segments 31 are spread apart increasing the angle at the apex of recess 29. While this would be less desirable than obtaining full surface contact between the conical surfaces, it would, nevertheless, operate satisfactorily to force the periphery of plug 12 adjacent the segments 31 into intimate engagement with the inner walls of the socket 11 in accordance with the present invention.

Thus, while the area of actual initimate metal-to-metal contact between the connector parts in many electrical connectors available heretofore is more or less haphazard, there is in the present connector a positive band of solid contact between the periphery of plug 12 adjacent its end and the inner wall of socket 11. The connector may, therefore, be designed to provide peripheral contact which is at least as great as the cross-sectional area of the electrical conductor in order to ensure adequate electrical conductance without loss of power. In addition, there is of course solid contact between the adjoining conical surfaces of projection 22 and recess 29. Such tight fitting contact positively eliminates resistance heating or arcing between the surfaces which not only reduces the flow of current but also causes deterioration of the contact surfaces.

Furthermore, expansion of the slotted end of plug 12 into rigid engagement with the side walls of bore 19 causes the plug and socket to be mechanically locked firmly together such that they can not be accidentally separated or rotated relative to each other. However, by exerting a positive external rotational force between the connector parts 11 and 12 in a direction which will cause the projection 22 and recess 29 to be cammed away from each other, the radial locking forces between the parts are broken and the parts may be disconnected. It may thus be observed that although in some prior connectors the cam groove and lug are the only means provided for locking the connector parts together, such cam means in the present connector are employed primarily for the purpose of spreading the end of the plug into peripheral contact with the socket which, in turn, resists any tendency for the parts to back-off or to make a loose connection. However, when it is desired to break the connection, a firm external rotational force turning the parts in the opposite direction to that in which the connection is made readily breaks the grip between them and cams them out of engagement.

It will also be observed that a positive mechanical locking connection between the parts of connector 10 can be effected by rotating one of the parts with respect to the other through only about a half a turn. This, of course, is dependent upon and may be controlled by, the pitch of the helical groove 27, the length of the flat 28, the angles of the interengaging conical surfaces 22 and 29, and the distance between cam lug 25 and the conical projection 22. While the specific embodiment of the invention disclosed herein has the end of plug 12 cut into four segments 31 (Fig. 5), it may of course be provided with only a single slot 30 dividing the end of the plug in half or, if desired, various other arrangements for rendering the plug expandable may be used. It may in some instances be preferable, in order to make the end of the plug more flexible, to decrease the thickness of the segments 31 by increasing the size of the recess 29 and of the projection 22.

What is claimed is.

A connector for electric cables comprising in combination a socket member and a plug member adapted to be received within said socket member, one of said members having a cam groove formed integrally therein and the other having a cam lug for engagement in said groove whereby the end of said plug is moved axially into engagement with the base of the socket member upon relative rotational movement therebetween, said socket member having a plug-expanding projection at the base of its socket, the end portion of said plug being resiliently expandable laterally and having a recess therein adapted to receive said projection, said plug-expanding projection and recess being conically shaped with the apex angle of such conical recess smaller than that of said projection whereby, upon axial movement of said socket and plug members under the urge of said cam groove and lug forcing said plug-expanding projection and recess into mutual engagement, the end of said plug is spread laterally by said plug-expanding projection into intimate peripheral contact with the inner walls of said socket member frictionally locking said socket and plug members against rotation relative to each other, while the conical surfaces of said recess and projection are brought into full surface contact with each other when said socket and plug members are fully engaged.

References Cited in the file of this patent

UNITED STATES PATENTS

| | | |
|---|---|---|
| 839,224 | Stokes | Dec. 25, 1906 |
| 2,767,384 | Burke | Oct. 16, 1956 |
| 2,785,385 | Figueira | Mar. 12, 1957 |
| 2,793,352 | Bird | May 21, 1957 |
| 2,851,670 | Senior | Sept. 9, 1958 |